Nov. 12, 1946.  W. J. O'BRIEN  2,410,994
WATER HEATER
Filed March 30, 1943  2 Sheets-Sheet 1

William J. O'Brien
INVENTOR.
BY Bodell and Thompson
Attys

Nov. 12, 1946.　　　W. J. O'BRIEN　　　2,410,994
WATER HEATER
Filed March 30, 1943　　　2 Sheets-Sheet 2

William J. O'Brien
INVENTOR.
BY Bodell & Thompson
Attys

Patented Nov. 12, 1946

2,410,994

UNITED STATES PATENT OFFICE 2,410,994

WATER HEATER

William J. O'Brien, Syracuse, N. Y.

Application March 30, 1943, Serial No. 481,164

1 Claim. (Cl. 257—2)

This invention relates to water heaters of the type wherein the water is heated by steam.

The invention has as an object, a water heater of the type referred to embodying a structure which is economical to build and which operates as both a storage heater and an instantaneous heater. As a storage heater, it has the advantage of always maintaining a supply of hot water available for immediate use, and as an instantaneous heater it has the advantage of heating a large volume of water under continuous flow.

The invention consists in the novel features and in the combinations and constructions hereinafter set forth and claimed.

In describing this invention, reference is had to the accompanying drawings in which like characters designate corresponding parts in all the views.

Figure 1:
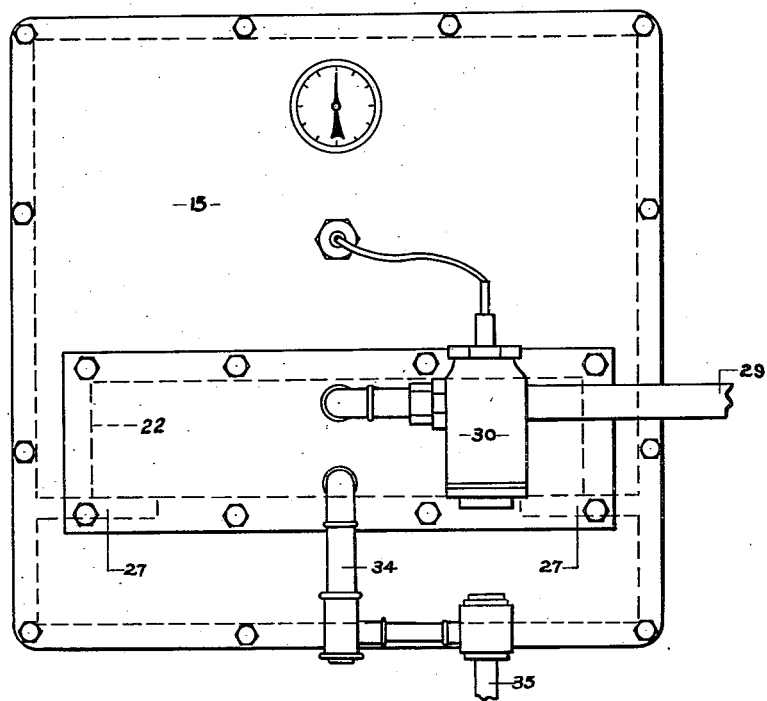
Figure 1 is an end elevational view of a heater embodying my invention.
Figure 2:
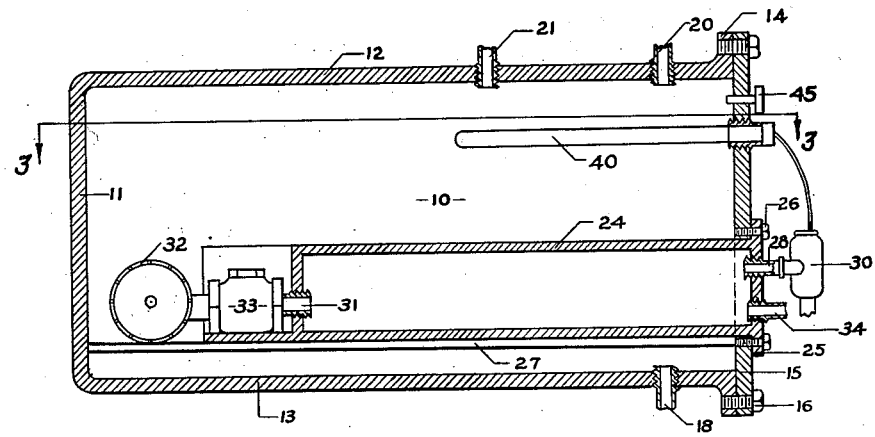
Figure 2 is a lengthwise sectional view.
Figure 3:
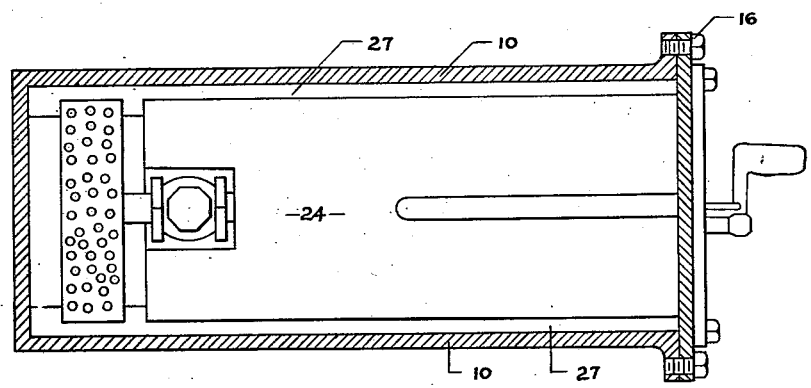
Figure 3 is a transverse sectional view taken on line 3—3, Figure 2.

The heater consists of an outer main casing having side walls 10, rear wall 11, top wall 12, and bottom wall 13. The forward end of the casing is open and provided with a marginal flange 14 to which an end closure 15 is detachably secured as by cap screws 16. The outer casing is preferably of rectangular formation, the bottom wall being provided with a cold water inlet 18, and the top wall 12 with a hot water outlet 20. The top wall is also provided with an outlet 21 for connection with a suitable relief valve.

The closure 15 is formed with a rectangular opening 22 extending substantially across the closure. This opening is for the purpose of receiving a closed steam chamber 24, the outer end of which is formed with a marginal flange 25 overlying the face of the closure 15 and being secured thereto as by cap screws 26. The side walls 10 are each formed with an inwardly extending rib 27 arranged in the plane of the bottom edge of the opening 22, the ribs extending lengthwise of the outer casing and serving to support the steam chamber 24 at its sides.

The outer end of the steam chamber is formed with a steam inlet 28 connected to a steam supply 29 through a thermostatically operated valve 30. The opposite or inner end wall of the steam chamber is provided with an outlet 31 connected to a steam diffuser 32 through a check valve 33. The steam chamber 24 terminates short of the rear wall 11 of the outer casing, and the diffuser 32 is arranged in the space between the inner end of the steam chamber and the back wall 11 of the casing. The forward end of the steam chamber is also provided with a condensate outlet 34 preferably connected to a source of vacuum through pipe 35. A thermostatic element 40 is secured in the end closure 15 intermediate the steam chamber 24 and the top wall 12 of the outer casing and in proximity to the hot water outlet 20. The valve 30 is adjusted so as to be operable to control the steam pressure within the steam chamber 24 according to the temperature of the water in proximity to the outlet 20. When this temperature falls below a predetermined minimum, the valve 30 permits the entrance of steam to effect a somewhat greater pressure in the steam chamber than the water pressure in the outer casing, whereby live steam is passed through the check valve 33 and is diffused in the water through the diffuser 32. When the temperature of the water has reached a predetermined maximum, the valve 30 closes or operates so as to reduce the steam pressure within the steam chamber somewhat below the pressure of the water in the outer casing, whereby live steam is not passed through the check valve 33.

The steam chamber 24 and ribs 27 divide the casing into upper and lower sections, the lower section constituting a cold water inlet section, and the upper section a hot water section. Because of this arrangement and the position of the cold water inlet, the cold water is preheated as it flows in contact with the under side of the steam chamber, whereby the diffusion of the live steam in the water is accomplished with the minimum amount of noise. When hot water is not being withdrawn from the heater, the temperature of the water in the casing builds up very rapidly and when it has reached the predetermined maximum, the steam pressure is reduced, as previously explained, and thereafter the water in the casing is held at the high temperature point by the heat transferred through the steam chamber 24. Accordingly, the water in the casing is always maintained at top temperature effecting a quick available supply.

Immediately however upon any substantial drop in temperature effected by the withdrawal of water through the outlet 20, live steam is diffused in the water and the water is maintained at proper temperature even though the flow through the heater is continuous.

It will be understood that the joint between the face closure 15 and the flange 14, and between the flange 25 and the face closure, will be supplied with suitable gaskets, and a thermometer 45 may be mounted in the face closure for conveniently checking the temperature of the water at the outlet 20. The outer casing and the steam chamber 24 may be formed of cast iron. In the event that the outer casing should become coated with lime, or there should be an accumulation of foreign matter for any other reason, it may be conveniently cleaned by removing the end closure 15 together with the heating chamber as a unit.

It will be noted that the heater contains few parts, all of simple construction and all of which are conveniently machined, resulting in a structure of low initial cost and low maintenance cost. The heater serves to supply a volume of hot water which would require a large storage heater and has the advantage over instantaneous heaters in that if the device is not in use over a substantial period of time, the water in the heater will not become cooled. In other words, there is always a supply of hot water available for immediate use and this supply is great because of the instantaneous heating feature.

What I claim is:

A water heater comprising a casing, a closed steam chamber arranged within the casing, said casing being provided with a cold water inlet and a hot water outlet, said inlet and outlet being arranged to cause the flow of water from the inlet to the outlet to pass in heat exchanging relation to said steam chamber, said steam chamber being formed with a steam inlet and a steam outlet, a steam diffusing member arranged in the casing and positioned in the water flow intermediate said water inlet and outlet and connected to said steam outlet through a check valve, said steam inlet being connected through a thermostatically controlled regulator operable to control the flow of steam to said steam chamber to maintain the water in the casing at all times within a predetermined temperature range, said check valve being operable to permit steam to discharge from said steam chamber through said diffusing member when the steam pressure in said chamber exceeds the water pressure in the casing, whereby the steam is diffused in the water through the diffusing member.

WILLIAM J. O'BRIEN.